(12) United States Patent
Ishida et al.

(10) Patent No.: US 7,572,468 B1
(45) Date of Patent: Aug. 11, 2009

(54) EXTRACTION OF CAROTENOIDS FROM PLANT MATERIAL

(75) Inventors: Betty K. Ishida, El Cerrito, CA (US); Mary H. Chapman, El Cerrito, CA (US); Sarabjit Singh Randhava, Evanston, IL (US); Sikander Singh Randhava, Evanston, IL (US)

(73) Assignees: The United States of America as represented by the Secretary of Agriculture, Washington, DC (US); United Technologies, Mt. Prospect, IL (US)

( * ) Notice: Subject to any disclaimer, the term of this patent is extended or adjusted under 35 U.S.C. 154(b) by 0 days.

(21) Appl. No.: 11/319,148

(22) Filed: Dec. 27, 2005

Related U.S. Application Data

(60) Provisional application No. 60/640,029, filed on Dec. 28, 2004.

(51) Int. Cl.
*A01N 65/00* (2006.01)
*A61K 36/81* (2006.01)

(52) U.S. Cl. .................. 424/725; 424/777

(58) Field of Classification Search ............... None
See application file for complete search history.

(56) References Cited

U.S. PATENT DOCUMENTS

| | | | |
|---|---|---|---|
| 3,172,770 A | | 3/1965 | Miller |
| 5,245,095 A | | 9/1993 | Graves et al. |
| 5,274,073 A | * | 12/1993 | Gruber et al. |
| 5,462,695 A | * | 10/1995 | Tsai et al. |
| 5,686,489 A | * | 11/1997 | Yu et al. |
| 5,714,658 A | | 2/1998 | Heidlas et al. |
| 5,773,075 A | | 6/1998 | Todd |
| 5,789,647 A | | 8/1998 | Heidlas et al. |
| 5,830,738 A | * | 11/1998 | Thomas et al. |
| 5,837,311 A | | 11/1998 | Zelkha et al. |
| 5,871,574 A | | 2/1999 | Kawaragi et al. |
| 5,897,866 A | | 4/1999 | Bombardelli et al. |
| 6,818,239 B2 | | 11/2004 | Kagan et al. |
| 2003/0052424 A1 | * | 3/2003 | Turner et al. |
| 2003/0061761 A1 | * | 4/2003 | Nanninga et al. |
| 2003/0180435 A1 | | 9/2003 | Shi |
| 2004/0115260 A1 | * | 6/2004 | Schmid et al. |
| 2004/0131733 A1 | | 7/2004 | Rey et al. |
| 2004/0208983 A1 | * | 10/2004 | Hill et al. |

FOREIGN PATENT DOCUMENTS

JP 53118597 A * 10/1978

OTHER PUBLICATIONS

Ollanketo, M. et al., "Supercritical carbon dioxide extraction of lycopene in tomato skins," *Eur. Food Res. Technol.* (2001) 212:561-565.
Periago, M.J. et al., "Mixture Approach for Optimizing Lycopene Extraction from Tomato and Tomato Products," *J. Agric. Food Chem.* (2004) 52:5796-5802.
Rozzi, N.L. et al., "Supercritical Fluid Extraction of Lycopene from Tomato Processing Byproducts," *J. Agric. Food Chem.* (2002) 50:2638-2643.
Christensen et al., Res Commun Chem Pathol Pharmacol., vol. 50(1), pp. 147-150, 1985.

* cited by examiner

*Primary Examiner*—Michele Flood
(74) *Attorney, Agent, or Firm*—Howard V. Owens, Jr.; Margaret A. Connor; John D. Fado

(57) ABSTRACT

Methods for extraction of carotenoids from carotenoid-containing plant material using an extraction solvent comprising ethyl lactate. The invention is also directed to products obtained thereby. In the method, a sample of dry, particulate carotenoid-containing plant material is contacted with the ethyl lactate extraction solvent to extract the carotenoids. The method also includes the use of an ethyl lactate-ethanol blend as the extraction solvent. After extraction, the solvent containing the extracted carotenoids is separated from the extracted plant solids and treated to separate the dissolved carotenoids from the extraction solvent and obtain a carotenoid-containing concentrate. The concentrated carotenoid product may be used directly or may be subjected to further treatment. After removal of the dissolved carotenoids, the extraction solvent can be recycled for further use.

6 Claims, 2 Drawing Sheets

EXTRACTION OF CAROTENOIDS FROM PLANT MATERIAL

REFERENCE TO RELATED APPLICATION

This application claims the benefit of U.S. Provisional Application No. 60/640,029, filed 28 Dec. 2004, incorporated by reference in its entirety.

BACKGROUND OF THE INVENTION

1. Field of the Invention

The present invention relates to improved methods for extraction of carotenoids from carotenoid-containing plant material. More particularly, the invention relates to methods for extracting carotenoids from plant material using ethyl lactate. The invention is also directed to products obtained by the methods.

2. Description of the Art

Carotenoids are natural pigments that occur in bacteria, plants, fungi, and animals. Carotenoids comprise a class of hydrocarbons (carotenes) and their oxygenated derivatives (xanthophylls). Most carotenoids are 40 carbon isoprenoid compounds called tetraterpenes. Carotenoids having fewer than 40 carbons can result from loss of carbons within the chain (norcarotenoids) or loss of carbons from the end of the molecule (apocarotenoids). Longer carotenoids, homocarotenoids (C45-C50), are found in some bacterial species. The alternating double bonds along the backbone of carotenoid molecules form a polyene chain, which imparts unique qualities to this group of compounds. This alternation of single and double bonds also allows a number of geometrical isomers to exist for each carotenoid. Carotenoids exist in both trans- and cis-isomeric forms of which the former can be converted to the latter by exposure to light, heat, or chemical reaction.

Carotenoids cannot be synthesized by humans, hence, must be obtained from dietary sources. For humans the most important sources for carotenoids are plants. These are primarily highly pigmented red, orange, and yellow fruits and vegetables. Exemplary carotenoids found in fruits and vegetables are lycopene, $\beta$-carotene, lutein, zeaxanthin, lutein plus zeaxanthin, $\beta$-cryptoxanthin, and $\alpha$-carotene. Lycopene is typically the carotenoid consumed in greatest amounts in Western diets. Per capita intakes in Europe and North America average from 1.6 to more than 18 mg lycopene per day. More than 85% of the lycopene in North American diets comes from tomato products, which also contain significant amounts of other carotenoids ($\alpha$- and $\beta$-carotene and lutein/zeaxanthin).

More than 20 pigments in the carotenoid class have been identified and quantified in tomatoes with lycopene being the principal carotenoid. Typically lycopene amounts to 85-90% by weight of the carotenoids in tomatoes. Concentrations of lycopene in common tomatoes ranges from 30 to 100 ppm, on the average at 50 ppm, fresh weight basis. Low amounts of other carotenoids such as $\alpha$-carotene, $\beta$-carotene, $\gamma$-carotene, $\epsilon$-carotene, phytoene, phytofluene, neurosporene, and lutein are also present in tomatoes. Lycopene provides the richness and bright red color to the tomato, making it commercially important as a natural pigment. Processed foods are frequently fortified with carotenoids such as lycopene to increase nutritive value and/or enhance attractiveness.

Carotenoids are important factors in human health. The essential role of $\beta$-carotene as an important dietary source of vitamin A has been known for many years. More recently, protective effects of carotenoids against serious disorders such as cancer, heart disease, and degenerative eye disease have been recognized.

Carotenoids act as antioxidants and/or singlet oxygen quenchers or as free radical scavengers. With 11 conjugated double bonds and no cyclic groups, lycopene is the most potent biological antioxidant. Of the many health benefits attributed to the consumption of carotenoids, these provide the greatest clinical depth.

Lycopene is an important antioxidant and free radical scavenger.

Free radicals can cause damage both to the structure and to the function of cell membranes, DNA, and proteins. This damage has been linked to the onset of many degenerative diseases such as cancer, atherosclerosis, cataracts, and age-related macular degeneration as well as to premature aging. The free radical quenching constant of lycopene has been demonstrated to be more than twice that of $\beta$-carotene.

Lycopene is incorporated into lipoproteins. There it acts to decrease the oxidation of cholesterol, helping to prevent vascular damage.

Lycopene in the blood has been shown to be inversely proportional to the incidence of prostate tumors.

Research shows lycopene may provide protection against a broad range of epithelial cancers.

Carotenoids are broadly used as dietary supplements due to their antioxidant potential, and lycopene has a strong presence in the nutraceuticals market.

Processes for preparing tomato concentrates have been reported. U.S. Pat. No. 3,172,770 relates to a process for preparing a tomato concentrate by means of crushing tomatoes and separating the juice into pulp and serum by centrifugation.

Processes for extraction of carotenoids have been reported. U.S. Pat. No. 5,837,311 to Zelkha et al. describes a process in which crushed, heated tomatoes are fractionated into serum and pulp containing at least 500 ppm lycopene; the lycopene is extracted from the pulp using a solvent. The solvents listed by patentees as satisfactory are hexane, ethyl acetate, and dichloromethane; however, neither dichloromethane nor hexane are environmentally friendly. U.S. Pat. No. 5,871,574 to Kawaragi et al. uses an enzymatic technique to macerate tomato pulp to facilitate easier downstream processing. Their downstream processing entails centrifuging to recover the liquid portion and then passing this liquid through a microfilter and collecting the retentate. This enables an appropriate microfractionation to optimize pigment size. The crude pigment may be further purified by agitation in 75% organic solvent such as methanol, ethanol, propanol, or acetone, and then recovering the sediment. The sediment is then dried to yield a tomato pigment. U.S. Pat. No. 5,773,075 to Todd describes high temperature countercurrent solvent extraction of *Capsicum* solids using edible solvents such as edible oils or fats or derivatives thereof. U.S. Pat. No. 5,897,866 to Bombardelli et al. describes a process to obtain lycopene wherein partially dehydrated whole fruits of *Lycopersicum esculentum* (tomato) are extracted with a solvent in the presence of phospholipids as surfactant and stabilizing agents and the extracts are concentrated or fractionated to an oil. The preferred solvents are n-hexane and methylene chloride, and the preferred phospholipid is soy lecithin. PCT Application No. WO 01/38443 A1 to Bortlik et al. describe a process for extraction of lycopene from tomatoes and tomato pomace using boiling ethanol. U.S. Pat. No. 6,818,239 to Kagan et al. describes a process for the extraction of carotenoids from a carotenoid source such as a biomass, which comprises treating the carotenoid source at an elevated temperature with a solvent mixture comprising water, a hydrophobic carotenoid solvent such as vegetable oil and a water soluble co-solvent such as ethanol so as to extract the carotenoid source into the hydrophobic solvent. U.S. Pat. No. 5,714,658 to Heidlas et al. describes extraction of carotenes from natural sources, by contacting the starting material with a solvent mixture composed of at least one acetic ester of $C_1$-$C_4$ alcohols and 1 to 25% by weight of an oil of biological origin at a temperature of at least 30° C. U.S. Pat. No. 5,789,647 to Heidlas et al. describes extraction of carotenoid dyes from pre-dried natural starting materials using compressed gases such as propane or butane and optionally an organic entraining agent such as acetone, ethyl acetate, or ethanol. U.S. Pat. No. 5,245,095 to Graves et al. describes a process of extraction of carotenoids from carrots wherein a carotenoid-precipitation agent including calcium chloride, calcium hydroxide, calcium lactate, or calcium gluconate is added to a liquid fraction obtained from a carotenoid-containing natural source to form a carotenoid-enriched solid precipitate. U.S. Pat. No. 5,830,738 to Thomas et al. describes a process for extracting carotenoids from pigmented plant material, which includes contacting shredded plant material with an enzyme.

Processes to extract carotenoids such as lycopene using supercritical $CO_2$ have been described. See Ollanketo et al., *European Food Research Technologies* 212: 561-565, 2001, Rozzi et al., *Journal of Agriculture and Food Chemistry* 50:2638-2643, 2002, and U.S. Patent Applications 20030180435 and 20040131733.

SUMMARY OF THE INVENTION

The present invention is directed to improved methods for extraction of carotenoids from carotenoid-containing plant material. In its broadest ambit, the invention is directed to methods for extracting carotenoids from dry, particulate plant material using an extraction solvent comprising ethyl lactate. The invention is also directed to products obtained by the methods of the invention.

In a preferred embodiment, the extraction solvent comprises a blend of ethyl lactate and ethanol, whereas the amount of ethyl lactate in the blend is 80% or greater. Subsequent to extraction, the extraction solvent containing the extracted carotenoids is separated from the extracted plant solids and treated to separate the dissolved carotenoids from the extraction solvent and obtain a carotenoid-containing concentrate. The concentrated carotenoid product may be used directly or may be subjected to further treatment. In a preferred embodiment, the extraction solvent after removal of the dissolved carotenoids is recycled for further use.

As discussed in detail below, any carotenoid-containing plant material may be used, including fruits and vegetables, whole or parts, or mixtures thereof. A particular advantage of the invention is that the invention methods can utilize waste products obtained from the processing of fruits and vegetables such as tomato slurry waste. In this way, valuable carotenoids can be obtained from a zero-value waste product.

Prior to extraction, the plant material may be treated by procedures such as comminution or enzyme treatment or combinations thereof so as to increase the accessibility of the extraction solvent to the carotenoids in the plant material. The treated material is dried. Preferably, drying is carried out at temperatures that minimize degradation of carotenoids.

The dried, particulate plant material may be extracted directly or may be subjected to additional processes such an further comminution prior to extraction.

The following describes a preferred embodiment of the invention: Vegetable material is mechanically blended into a puree, subjected to a reduction in particle size, and then subjected to an enzymatic treatment to increase accessibility of the carotenoids to the solvent. The slurry is then converted into a solid particulate form, having a moisture content of less than 10 wt %. The dried powder is subjected to a second reduction in particle size, extracted with an extraction solvent comprising ethyl lactate, and then processed through a high speed centrifuge where the residual solids are discharged and the liquid directed to an evaporator. The ethyl lactate solvent is recycled back from the evaporator.

The invention is also directed to products obtained by the methods. The concentrated carotenoids obtained by the methods of the invention are useful for human consumption to provide antioxidant and other health benefits. They may be used as dietary supplements, nutraceuticals, or as additives included in functional foods.

Other objects and advantages of the invention will become readily apparent from the ensuing description.

DETAILED DESCRIPTION OF THE INVENTION

Figure 1:
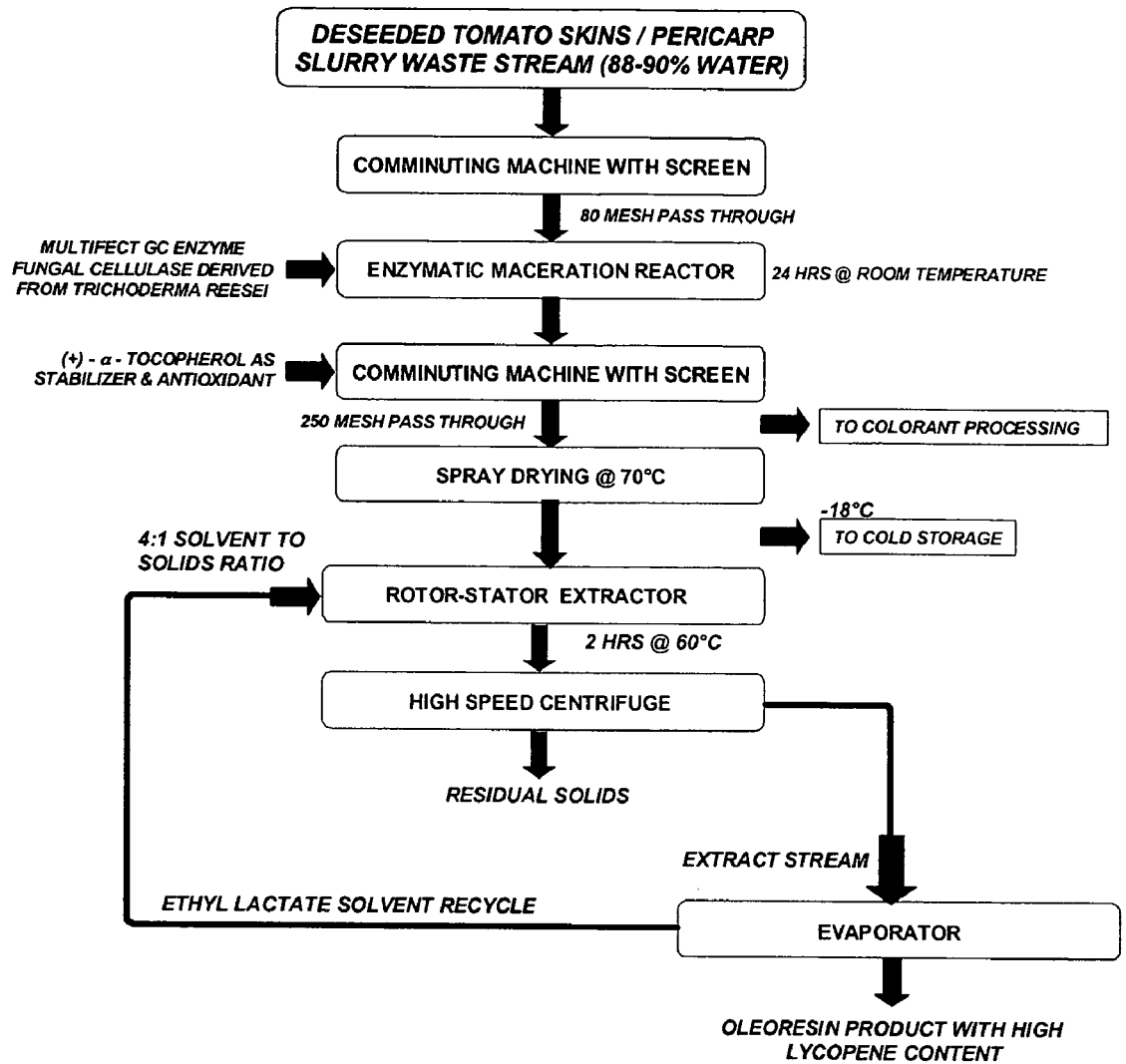
FIG. 1 shows a flow diagram illustrating details of one embodiment of the invention.

Unless defined otherwise, all technical and scientific terms used herein have the meaning commonly understood by a person skilled in the art to which this invention belongs. Sieve size designation is given using the ASTM Sieve Chart using standard designations that correspond to the values for test sieves apertures recommended by the International Standards Organization Geneva, Switzerland. The alternative sieve designation is given in parentheses.

In its broadest ambit, the invention is directed to methods for extracting carotenoids from dry, particulate plant material using an extraction solvent comprising ethyl lactate. The invention is also directed to products obtained by the methods of the invention. Details of embodiments of the invention are set forth below.

Starting Materials for the Methods of the Invention

Plant Material. Starting materials for the practice of the methods of the invention include carotenoid-containing plant material. Examples are carotenoid-containing fruits and vegetables and includes whole or parts of a plant or mixtures thereof. Without being limiting, examples of carotenoid-containing fruits include tomato, watermelon, Gac (Momordica cochinchinensis), papaya, guava, mango, and grapefruit). Without being limiting, examples of carotenoid-containing vegetables include autumn olive, carrots, parsley, and spinach. Without being limiting, examples of plant parts include parts of fruit, such as pericarp (whole or parts), aril (a fleshy coating surrounding seeds), leaves (e.g., of spinach and parsley), and roots or tubers (carrots and sweet potato), or parts of plants resulting from processing, such as tomato pomace and peel or skins. The starting material could be fruit or vegetable product, for example, a puree. A preferred embodiment of the invention is the utilization of tomatoes and tomato peel and/or pomace for extraction of the carotenoid compound lycopene.

A particular advantage of the invention is that the starting material for the methods of the invention can comprise waste products obtained from the processing of fruits and vegetables. For example, tomato slurry waste, e.g., skins, pericarp, and juice, obtained from tomato processing such as when tomatoes are skinned prior to canning, can be used as a starting material. In this way, valuable carotenoids can be obtained from a zero-value waste product.

Form of the Plant Material for Extraction. The plant material subjected to extraction is in the form of a dry, particulate solid, for example, a free-flowing powder. The plant material may be treated by known procedures to obtain the dry particulate starting material. Generally, the moisture content of the dry, particulate plant material is no greater than about 15% moisture, and preferably, no greater than about 10% moisture, and more preferably no greater than about 5-7% moisture. Extraction is most efficient wherein the dry, particulate solids have a small particle size so that the extraction solvent has ready accessibility to the carotenoids. Generally it is desired that the particles of the dry, particulate material are a size to pass through a seive in a range of 150 μm (No. 100), preferably 75 μm (No. 200), more preferably 63 μm (No. 230), and most preferably 38 μm (No. 400). Treatments to increase accessibility of the carotenoids to the extraction solvent is discussed in detail below.

The dry powdered material may be used immediately or may be stored for later use. Preferably, for storage the material is freeze-dried or frozen and stored under conditions that minimize degradation of carotenoids such as in the dark in a cooled, sealed container. We have found that suitable conditions for storing tomato material is in a closed (sealed) container in the dark at subfreezing temperatures.

Extraction Solvent. The extraction solvent for the methods of the invention is one that comprises ethyl lactate. Ethyl lactate, $CH_3CHOHCOOC_2H_5$, CAS No. 97-64-3, also known as 2-hydroxypropanoic acid ethyl ester and ethyl 2-hydroxypropionate, is a colorless liquid [$d_4^{14}$ 1.042; b.p. 154° C.; flash pt, closed cup: 47° C.], and has a characteristic odor. It is commercially available and is considered biodegradable. It is approved as an additive by the U.S. Food and Drug Administration.

The ethyl lactate extraction solvent can also comprise ethyl lactate blended with other solvents, wherein the amount of ethyl lactate in the blend is about 80% or greater, preferably about 90% or greater, and more preferably about 93% or greater. A preferred co-solvent is ethanol. We have found that the presence of ethanol increases the extraction of lycopene. Ethanol also inhibits lactic acid creation from contact between ethyl lactate and any water of the plant material. The range of ethanol in an ethyl lactate:ethanol extraction solvent blend is generally about 0-20% ethanol, preferably about 1-10% ethanol, and more preferably about 5-7% ethanol. Generally the ratio of ethyl lactate:ethanol is 80:20 or greater, preferably 90:10 or greater, more preferably 95:5 and most preferably 93:7. The total water concentration in the extraction solvent plus carotenoid-containing plant material should generally not exceed about 8%, preferably should not exceed about 4%, and more preferably should not exceed about 2%.

The solvent system described above may also be incorporated into a packaged kit with containers suitable for storage of ethyl lactate (alone or blended with suitable co-solvents such as ethanol), antioxidant(s) and enzymes.

Extraction Procedures. The dry, particulate carotenoid-containing plant material is contacted with an extraction solvent comprising ethyl lactate under conditions effective to extract carotenoids from the plant material. Generally, extraction is carried out in a temperature range of about 50 to 70° C., preferably about 55 to 65° C., and more preferably about 60° C. The time for extraction can vary depending on the plant material and size of the sample and desired degree of extraction. The time and temperature in a particular set of circumstances that will provide the desired degree of extraction of carotenoids can be determined by tests as described in the Example, below.

The ratio of extraction solvent to dry, particulate plant material is greater than 1:1 (solvent:solid). The particular solvent to solid ratio that is optimum in a particular set of circumstances can vary depending on the material to be extracted. This can be determined by test runs as described in the Example, below. Generally the ratio of extraction solvent to dry, particulate plant material is in the range of about 3:1 to 9:1 solvent:solids. The preferred range is about 4:1 to 8:1 solvent:solids. A single extraction protocol may be used. Alternatively, two or more extractions may be carried out as desired.

Separation of Extraction Solvent. Subsequent to extraction, the extraction solvent containing the extracted carotenoids is separated from the extracted solids. Separation of the liquid and solid phrases can be carried out by methods known in the art, including for example, filtration, centrifugation, and membrane separation. Filtration may be carried out using any suitable filtration material.

Concentration of Extracted Carotenoids. The extraction solvent containing the extracted carotenoids is treated to separate the dissolved carotenoids from the extraction solvent so as to concentrate the extracted carotenoids. This may be carried out by known methods such as evaporation of the solvent to yield a concentrated carotenoid-containing product. The product may be used directly or may be subjected to further treatment. For example, individual carotenoids may be separated from the concentrate. In a preferred embodiment, the extraction solvent after removal of the dissolved carotenoids is recycled from the evaporator for further use.

The methods of the invention may include additional process steps. In the preferred embodiments of the methods of the invention, the plant material is treated so as to increase accessibility of the carotenoids in the plant material to the extraction solvent. This can include processes that break or rupture plant cell walls or tissues and thereby increase accessibility of the carotenoids. Methods include reducing the particle size of the plant material such as by comminution, milling, grinding, or other method that shears and/or grinds the material into small particles, hereinafter denoted as comminution treatment. In commercial processing, comminution processors use the principle of incremental shear to ensure highly efficient comminution by rotating the product inside a stationary reduction head at high rotational speeds. In this way, a continuous, single pass operation can achieve consistently uniform particle-size reduction at high capacities, while minimizing heat generation.

Comminution can be carried out in one or more stages. In a preferred embodiment, two comminution stages are used. In the first stage, the plant material is comminuted to at least pass through a 4.00 mm (No. 5) sieve or equivalent. Generally, comminution of the carotenoid-containing plant material is carried out to obtain particles to pass a sieve in the range of 4.00 mm (No. 5) to 75 μm (No. 200) or equivalent. Preferably, the particles pass a sieve in the range of 1.00 mm (No. 18) to 106 μm (No. 140) or equivalent. More preferably, the particles pass a sieve in the range of 250 μm (No. 60) to 180 μm (No. 80) or equivalent. In the second stage, the comminuted plant material is comminuted to at least pass through 150 μm (No. 100) or equivalent. Generally, comminution of the carotenoid-containing plant material is carried out to obtain particles to pass a sieve in the range of about 150 μm (No. 100) to 38 μm (No. 400) equivalent. Preferably, the particles pass a sieve in the range of about 90 μm (No. 170) to 45 μm (No. 325) or equivalent or in the range of about 75 μm (No. 200) to 53 μm (No. 270) or equivalent.

Accessibility of carotenoids to the extraction solvent may also be increased by treatment of the plant material with one or more enzymes that break down cell structures of plant cells or tissues or otherwise make carotenoids more accessible. Without being limiting, examples of enzymes include cellulases, hemicellulases, pectinases, and proteinases or combinations thereof. Enzyme treatment is carried out using known protocols for the selected enzymes.

A preferred enzyme is cellulase. When the plant material is comminuted tomato slurry, a recommended protocol is cellulase treatment such as *Trichoderma reesei* at ambient temperature for 24 hours or until the tissue structure is substantially macerated. U.S. Pat. No. 5,830,738 describes enzyme treatment protocols.

The methods of the invention to increase accessibility of the carotenoids in the plant material to the extraction solvent can encompass both comminution treatment and enzyme treatment as discussed in detail below. Where both a two-stage comminution treatment and an enzyme treatment are carried out, it is preferred that the enzyme treatment be between the first and second comminution stages. In a preferred embodiment, the plant material from the enzyme treatment is dried prior to the second stage comminution treatment. As discussed above, drying should be carried out at temperatures to minimize degradation of carotenoids. It is preferred that the method of drying does not exceed a degradation threshold for the carotenoid compounds of about 70° C. Preferably, drying is conducted at temperatures less than 70° C. A preferred embodiment is drying with a Refractance Window Drying unit. Other drying methodologies that allow for processing below 70° C. include spray drying, lyophilization, and catalytic infra-red drying.

In a preferred embodiment, the carotenoid-containing plant material is treated with a stabilizing agent to prevent or inhibit carotenoids from oxidizing or otherwise degrading. Without being limiting, examples of carotenoid-stabilizing agents include antioxidants, preferably edible antioxidants, including, for example, alpha-tocopherol. Other antioxidants include lecithin, ascorbic acid, BHA. Adding an antioxidant increases the yield of carotenoids during the extraction process by preventing oxidative degradation. The antioxidant or other stabilizing agent may be added at any stage, preferably prior to and during extraction. Preferably it is added to the plant material prior to the first comminution treatment.

The following provides a preferred manufacturing process. This is illustrated in the flow diagram shown in FIG. 1.

1) The tomato material entering the processing plant is treated to provide a material having a moisture level that provides ready pumpability. Depending on the moisture content of the material, water may have to be added to or removed from the material. Tomato pomace, for example, would be too dry to allow good mixing of antioxidant added to it and also would not be easy to move through the process. However, if the material were tomato peel, which is obtained from processing plants as a watery slurry, excess water is disadvantageous because it would dilute the added antioxidant, as well as add weight to the material to be transported through the process. Some moisture is needed to aid in transporting material, which depends upon flowing from one chamber to the next (pumping). It is desirable that the moisture content is sufficient to allow the slurry to be pumped like a liquid, but not so wet that it is necessary to expend a lot of energy in reducing the water content—which is eventually needed to produce a dry, powdered material. Generally 50-70% water is suitable. Water is also useful for total distribution of water-borne anti-oxidants in the material. Reduction of excess water can be conveniently accomplished with a filter press, centrifuge, or other method known in the art.

2) An antioxidant such as of α-tocopherol is added to the tomato feedstock to preserve the carotenoids prior to and during extraction.

3) The tomato material is mechanically blended into a puree using a high-speed comminution mill. The design specifications for the comminuting stage is a product with a mesh pass-through in the range of about 400 mm (No. 5) to 75 μm (No. 200).

4) As the tomato processing plant operates 100 days per year, and the lycopene plant operates 330 days per year, the comminuted material may frozen.

5) The comminuted tomato slurry is subjected to an enzyme treatment. The enzyme itself is selected based on the nature of the starting material, but, in the preferred embodiment of the invention, it is a cellulase enzyme. This treatment is carried out at conditions indicated by the enzyme manufacturer for the selected enzyme. The preferred embodiment is at ambient temperature for a period of 24 hours until the tissue structure is mostly macerated. This enzymatic maceration of the tomato material degrades the cellulosic bonds that hold the lycopene, thus enabling it to be more extractable.

6) The macerated slurry is further comminuted to generate additional breakdown of cell walls in an effort to enhance lycopene yield. The design specifications for this comminuting stage is to get a product with a mesh pass-through in the range of about 150 μm (No. 100) to 38 μm (No. 400).

7) The slurry is then reduced in moisture content to less than 15 wt %, and preferably less than 10 wt %. This reduction may be done by lyophilizing the slurry. Another embodiment of the invention is to concentrate the slurry using an appropriate filter such as a plate and frame, leaf, or nutsche. Other potential methods for reduction of water content is utilization of a hydrocyclone, refractive window drying, and spray drying under mild thermal conditions.

8) This powdered material may be used immediately, but, if stored, should be kept in the dark in a cooled, sealed container. For example, the tomato material may be stored in a closed (sealed) container in the dark at sub-freezing temperatures.

9) The dried powder is subjected to the extraction solvent comprising ethyl lactate and preferably an ethyl lactate-ethanol blend for a period between 0 and 24 hours at greater than ambient temperature. The extractor utilizes high speed agitation.

10) The slurry is theri processed using a high speed centrifuge where residual solids are discharged and the liquid directed to product recovery. The solvent is evaporated and distilled to recover the ethyl lactate for reuse.

Invention Products. The invention is also directed to products obtained by the methods. The concentrated carotenoids obtained by the methods of the invention are useful for human consumption to provide antioxidant and other health benefits. They may be used as dietary supplements, nutraceuticals, or as additives included in functional foods.

The product from tomatoes provides a considerably purified tomato extract containing a high concentration of lycopene. Other compounds present in the extracted material may include some lipid-soluble material, as well as compounds that are somewhat soluble in water. These would include, but not limited to, other carotenoids such as α- and α-carotene, phytoene, phytofluene, lutein, and zeaxanthin, as well as proteins, oils, phenols, and other antioxidants.

The following is a description of a preferred embodiment. Carotenoids are extracted from tomato skins recovered from a peeling and canning facility.

Extraction from Tomato Skins

In this embodiment, the tomato skins are recovered from a peeling and canning facility in the Southern Central Valley of California. The skins have a moisture content of approximately 95%, making transportation and storage of the material in its untreated state very challenging. The skins contain an extremely high percentage of the total lycopene content of the tomato, making processing of the skins an important source of lycopene. Composition of the material is seen below.

| Sample | % Solids | Trans (mean) | SD | Cis (mean) | SD | Ratio T:C | Total Lycopene µg/g DW |
|---|---|---|---|---|---|---|---|
| Steam Peeled Skins | 5.09 | 7111.0 | 1152.8 | 447.4 | 66.8 | 15.9 | 7558.5 |

The moisture content of the tomato peel is 94.91%. Utilizing a filter press, the moisture content is normalized to >60% water to reduce transport burden and volume, while maintaining pumpability and sufficient liquid to allow material and enzyme contact within the slurry.

Prior to the first processing step, an antioxidant consisting of α-tocopherol (0.1-0.5%, w/w) is added to the tomato tissues. These compounds inhibit the oxidation of the carotenoids within the tissue and allow for a greater extraction yield.

To facilitate extraction of lycopene, the cell walls are ruptured and attachments of lycopene to various components of tomato tissues are disrupted. The greater the degree of cell wall breakdown, the higher the potential yield of lycopene and other carotenoids. In this preferred embodiment, several sequential treatments are used to increase accessibility of the carotenoids in the plant material to the extraction solvent. In this example, the tomato skins are subjected to a first comminution treatment, an enzyme treatment, and a second comminution treatment.

Tomato tissues are fed to the high-speed rotating impeller and strike the exposed cutting edges of the micro-cut blades with great velocity. This action results in removal of small particles until reduction is completed. The slurry particles are discharged through spaces between the blades. Because of high impeller speeds, product remains in the micro-cut head only a fraction of a second. The product is reduced into precise increments, emerging as uniform-sized particles. The specifications for this comminuting stage are designed to obtain a product having a 250 µm (No. 60) to 180 µm (No. 80) mesh pass through. The comminuted tomato slurry is subjected to an enzymatic treatment consisting of cellulases at 300 international units (IU)/g conducted in solution at pH 3.5 to 5.5, with an optimal pH of 4.5, and at ambient temperature or between 50° C. and 80° C. until the tissue structure is mostly macerated. Other hydrolytic digestive enzymes to break down cell walls of the tomato tissue and, in addition, enzymes to cleave bonds between carotenoids and proteins may be used as desired. This enzymatic maceration is desirable to increase lycopene accessibility and facilitate extraction of the lycopene.

The slurry is then reduced in volume in a centrifuge to decrease the energy required in the subsequent drying step.

The slurry is then converted via spray drying into a solid particulate form, having a moisture content of preferably less than 10% by weight. This conversion may be accomplished by lyophilizing the slurry as was done in initial experiments. Another embodiment is to spray dry this slurry under mild thermal conditions. This process is amenable and cost effective for industrial applications.

Design specifications for the next comminution stage is to get a product with a 63 µm (No. 230) mesh pass through. The comminution machine is a highly efficient processor. Consequently, the same comminutor can be used for both desired size reduction operations, given the fact that the heads are quickly and readily interchangeable.

This powdered material may be used immediately, but, if stored, should be kept in the dark in a cooled, sealed container. For example, the tomato material may be stored in a closed (sealed) container in the dark at −18° C.

The dried powder is then added along with an antioxidant, consisting of α-tocopherol at a range of 0.1 to 0.5%, w/w, to a blend of the ethyl lactate and ethanol (93:7), 4:1 solvent to solids ratio, for a period of 2 hours at 60° C. The extractor is a batch-type vessel or tank, utilizing high-speed agitation to mix the slurry and continuously expose the surface area of the tomato material to the solvent. Another embodiment is to use a continuous plug, flow-type extractor having an appropriate mixing agitator or elements to mix the slurry.

The slurry is then processed through a high-speed centrifuge where residual solids are discharged and the liquid directed to an evaporator. Another embodiment is to process the slurry in a filter such as a plate and frame, leaf, or nutsche, where the solids are discharged and the liquid fraction is directed to an evaporator. The ethyl lactate solvent is recycled back from the evaporator.

The liquid from the centrifuge may be directed to a concentrator where the dissolved solids content is increased. The concentrator is then a thermal type such as a falling film evaporator in which the film temperature of the liquid is maintained so as not to exceed 70° C. Another embodiment is a concentrator with a size-selective type capability, such as ultra-filtration or nano-filtration.

Ethyl lactate is recovered by condensing the vapor from the dryer in a heat exchanger and recycled back to the extractor. The recovered solvent is purified by filtration and/or distillation.

The residue is an oleoresin product that contains about 80+% lycopene.

The concentrated slurry is directed to a dryer where the remaining solvent is removed and the solids, including lycopene, are recovered.

Extraction from Tomato Pomace. Tomato pomace is a much more readily available material than tomato skins. While lycopene content is far lower than in the skins, moisture content is also lower, and the material is the most abundant of the tomato waste alternatives for this process. Material composition is shown below.

| Sample | % Solids | Trans (mean) | SD | Cis (mean) | SD | Ratio T:C | Total Lycopene µg/g DW |
|---|---|---|---|---|---|---|---|
| Pomace | 55.15 | 329.4 | 17.7 | 41.4 | 2.1 | 8.0 | 370.8 |

Extraction is carried out using the procedures described except solvent to solids ratio is 8:1.

Extraction from Whole Tomatoes. Whole tomatoes discarded because of bruising or other imperfections are another low cost potential feedstock. Whole tomatoes have a moisture content ≧92% and a resident lycopene and carotenoid content of 30-100 ppm. Extraction is carried out using the procedures described above.

EXAMPLES

The following examples are intended only to illustrate the invention further and are not intended to limit the scope of the invention.

Example 1

One-hundred grams of alkali-peeled, deseeded tomato skins were homogenized for 1 min, using a Waring blender. Multifect GC cellulase was added to a final concentration of 300 IU/g of tomato homogenate. The pH was adjusted to 4.5 with HCl and the mixture incubated in a shaking water bath at 55° C. for 24 h. The resulting fine paste was lyophilized at −20° C. until dry. The dry product was then ground in a mortar and pestle with dry ice ($CO_2$) and passed through a No. 200-mesh sieve. The moisture content was determined to be 5%, using a microwave solids and moisture analyzer (CEM Corporation). Three grams of the resulting powder were extracted using ethyl lactate:ethanol (99:1) at 60° C. in a 4:1 (solvent:solid) ratio in a shaking water bath. The tomato powder was extracted 3 times for 2 h each. The lycopene extract was separated from the solids by centrifugation and the solvent mixture replaced, maintaining the 4:1 ratio. The lycopene content of the extract was determined immediately by UV-VIS spectroscopy at 470 nm. After the first extraction, 115.9 μg/g dry weight of lycopene, or 72% of the total lycopene was obtained. Subsequent extractions removed lycopene that remained after the first extraction.

Example 2

Tomato pomace (9 pomace:1 water) was homogenized for 1 min, using a Waring blender. Multifect GC cellulase was added to a final concentration of 300 IU/g of tomato homogenate. The pH was adjusted to 4.5 with HCl and the mixture incubated in a shaking water bath at 55° C. for 4 h, after which most of the liquid was removed by centrifugation. The resulting slurry was then lyophilized at −20° C. until dry. The dry product was then ground in a mortar and pestle with dry ice ($CO_2$) and passed through a No. 60-mesh sieve. The moisture content was determined to be approximately 5%, using a microwave solids and moisture analyzer (CEM Corporation). One-half g of the resulting powder was extracted using ethyl lactate/ethanol (99:1) at 60° C. at a ratio of 8 solvent:1 solid for 2 h in a shaking water bath. The lycopene content of the extract was measured immediately by UV-VIS spectroscopy at 470 nm and found to be 3.5 μg lycopene/g dry wt.

Example 3

Extraction from Gac aril (Momordica cochinchinensis). A dehydrated, weighed amount of thawed preground GAC aril (oily fleshy red pulp that surrounds the seed) was extracted with ethyl lactate/ETOH (ratio of ethyl lactate to ethanol was 8:1, v/v). The total volume of the sample was measured and analyzed via UV spectroscopy. 3 ml samples were dried down under $N_2$ to a residue that was subsequently resuspended in 2 mls THF and analyzed via HPLC (results below):

| Carotenoid | conc. (μg/g) |
| --- | --- |
| trans-lycopene | 70.26 |
| cis-lycopene | 67.73 |
| trans-B carotene | 66.74 |
| cis-B carotenes a carotene | 37.45 |
| all lycopene (cis + trans) | 138.00 |
| all carotene | 169.65 |

Example 4

Figure 2:
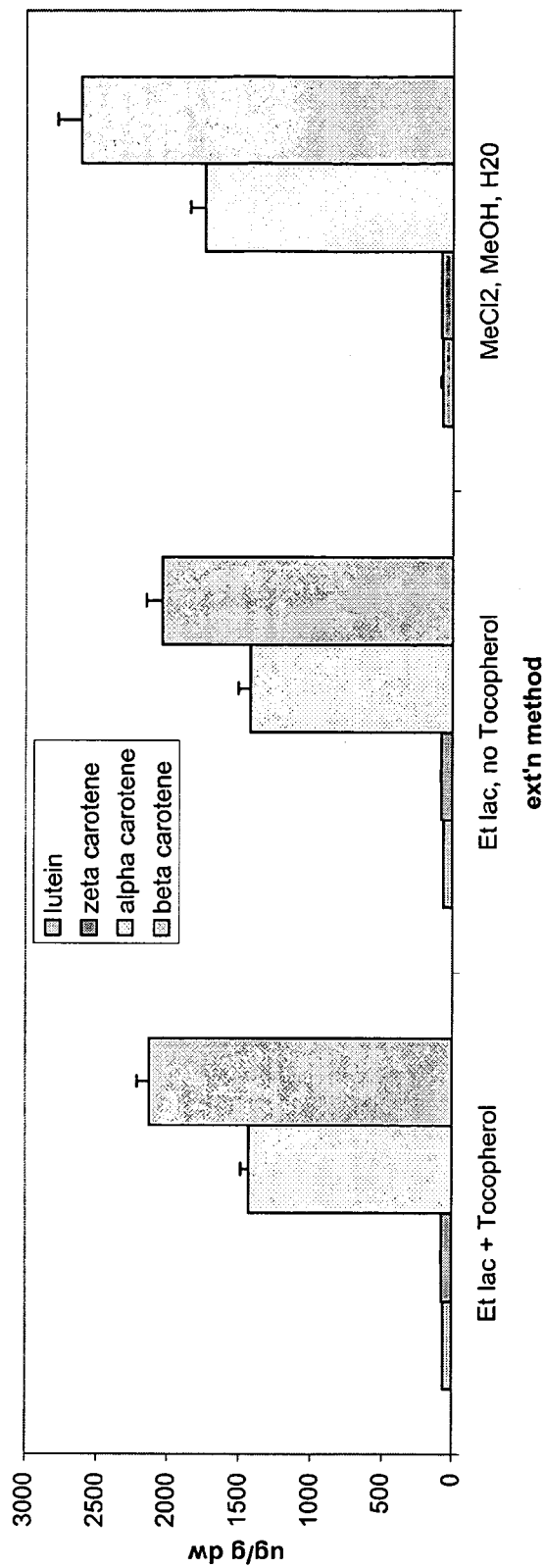
FIG. 2 shows a graph of extraction efficiencies of two embodiments of the invention.

Extraction from Carrots. Baby carrots were chopped, then blended with 100 mls of distilled deionized water to form a smooth paste. The paste was then lyophilized at −10° C. for 36 h, and then pulverized in $N_2$(l) using mortar and pestle. Samples were extracted in 5 mls ethyl lactate with or without tocopherol (ca 200 ul) for 45 min at 60° C. Two mls were then dried down under $N_2$ (g), dissolved in 2 ml THF and injected into HPLC. Samples of lyophilized carrots were also extracted via the typical Methylene Chloride/Methanol/H2O (MMH) solvent extraction. Results are set forth in FIG. 2.

Although the tocopherol did little to enhance the amounts extracted, this was probably because the extraction time was so short. However, the efficiency of ethyl lactate compared to MMH was excellent, higher even than that seen in tomato, again perhaps due to the short extraction time.

It is understood that the foregoing detailed description is given merely by way of illustration and that modification and variations may be made within, without departing from the spirit and scope of the invention. All publications and patents cited herein are hereby incorporated by reference in their entirety.

What is claimed is:

1. A composition for the extraction of carotenoids from plant matter consisting essentially of plant carotenoid-containing matter and a solution of ethyl lactate in combination with an amount of ethanol, wherein the amount of ethanol is in a range of about 1% to about 20% volume/volume (v/v) of the solution.

2. The composition of claim 1 wherein the amount of ethanol ranges from about 5 to about 7%.

3. The composition of claim 1, wherein the plant matter is selected from the group consisting of fruits, vegetables and mixtures thereof.

4. The composition of claim 3, wherein the fruits are selected from the group consisting of tomato, watermelon, Gac (Momordica cochinchinensis), papaya, guava, mango, and grapefruit.

5. The composition of claim 1, wherein the plant matter is selected from among a group comprising pericarp, aril, leaves, roots, tubers, tomato pomace, tomato peel, tomato skins and mixtures thereof.

6. The composition of claim 3, wherein the vegetables are selected from the group consisting of autumn olive, carrots, parsley, and spinach.

* * * * *